(12) United States Patent
Zuo et al.

(10) Patent No.: US 12,744,615 B2
(45) Date of Patent: Sep. 22, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhisong Zuo, Dongguan (CN); Weijie Xu, Dongguan (CN); Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 318 days.

(21) Appl. No.: 18/421,410

(22) Filed: Jan. 24, 2024

(65) Prior Publication Data

US 2024/0163004 A1 May 16, 2024

Related U.S. Application Data

(63) Continuation of application No. PCT/CN2021/110597, filed on Aug. 4, 2021.

(51) Int. Cl.

*H04J 13/10* (2011.01)
*G16Y 10/75* (2020.01)
*H04L 27/26* (2006.01)

(52) U.S. Cl.

CPC .......... *H04J 13/10* (2013.01); *H04L 27/2605* (2013.01); *G16Y 10/75* (2020.01)

(58) Field of Classification Search

CPC .. H04J 13/10; H04L 27/2605; H04L 27/2601; H04L 1/00; G16Y 10/75; H04B 1/69; H04B 1/707; Y02D 30/70

See application file for complete search history.

(56) References Cited

U.S. PATENT DOCUMENTS

| | | | | |
|---|---|---|---|---|
| 5,940,006 | A | 8/1999 | Maclellan | |
| 2009/0046702 | A1* | 2/2009 | Luo ......................... | H04J 13/10 370/350 |
| 2010/0156610 | A1 | 6/2010 | Wild | |
| 2010/0201492 | A1 | 8/2010 | Koo | |
| 2014/0292491 | A1 | 10/2014 | Maltseff et al. | |

(Continued)

FOREIGN PATENT DOCUMENTS

| | | | |
|---|---|---|---|
| CN | 1951048 | A | 4/2007 |
| CN | 102187348 | A | 9/2011 |

(Continued)

OTHER PUBLICATIONS

International Search Report in the international application No. PCT/CN2021/110597, mailed on Aug. 28, 2022, 5 pages with English translation.

(Continued)

*Primary Examiner* — Jung H Park
(74) *Attorney, Agent, or Firm* — Ladas & Parry LLP

(57) ABSTRACT

A method for wireless communication includes: a triggering signal transmitted by a network device is received; and a back scattering signal is transmitted to the network device, where the back scattering signal is a signal formed by reflecting and modulating a power supply signal transmitted by a power supply node in a manner of Code Division Multiplexing (CDM).

16 Claims, 14 Drawing Sheets

(56) References Cited

U.S. PATENT DOCUMENTS

| | | | | |
|---|---|---|---|---|
| 2020/0170514 | A1 | 6/2020 | Hui | |
| 2020/0313939 | A1 | 10/2020 | Lopez | |
| 2022/0225402 | A1* | 7/2022 | Elkotby | H02J 50/001 |
| 2022/0390393 | A1* | 12/2022 | Yan | H04L 7/033 |
| 2024/0146408 | A1* | 5/2024 | Herath | H04J 11/00 |

FOREIGN PATENT DOCUMENTS

| | | | |
|---|---|---|---|
| CN | 109560826 | A | 4/2019 |
| CN | 110289938 | A | 9/2019 |
| CN | 110971551 | A | 4/2020 |
| CN | 111031903 | A | 4/2020 |
| GB | 2259227 | A | 3/1993 |
| WO | 2019222242 | A1 | 11/2019 |

OTHER PUBLICATIONS

English translation of the Written Opinion of the International Search Authority in the international application No. PCT/CN2021/110597, mailed on Aug. 28, 2022, 6 pages with English translation.

Hui Xiaonan et al: "Code Division Multiple Access in Centimeter Accuracy Harmonic RFID Locating System", IEEE Journal of Radio Frequency Identification, IEEE, vol. 1, No. 1, Mar. 1, 2017 (Mar. 1, 2017), pp. 51-58, XP011673765, DOI: 10.1109/JRFID.2017.2745898, p. 52-p. 54; figures 1, 3.

Supplementary European Search Report in the European application No. 21952242.2, mailed on Oct. 8, 2024, 10 pages.

* cited by examiner

WIRELESS COMMUNICATION METHOD, TERMINAL DEVICE AND NETWORK DEVICE

CROSS REFERENCE TO RELATED APPLICATION

This is a continuation of International Application No. PCT/CN2021/110597 filed on Aug. 4, 2021, the disclosure of which is hereby incorporated by reference in its entirety.

TECHNICAL FIELD

Embodiments of the present disclosure relate to the field of communications, and in particular to a method for wireless communication, a terminal device and a network device.

BACKGROUND

With the increase of application demands in the 5-Generation (5G) mobile communication technology industry, there are more and more types of connectors and application scenarios, and there will be higher requirements for the price and power consumption of communication terminals. The application of passive Internet of Things devices without the need of battery and with low cost has become the key technology of cellular Internet of Things, which can enrich the types and quantity of terminals in the network, and then truly realize the Internet of Everything. The passive Internet of Things devices can be based on existing zero-power terminals, such as a Radio Frequency Identification (RFID) technology, and extended on this basis to be suitable for cellular Internet of Things.

Therefore, how to apply the zero-power terminal to the cellular Internet of Things is an urgent technical problem to be solved in this field.

DETAILED DESCRIPTION

Figure 1:
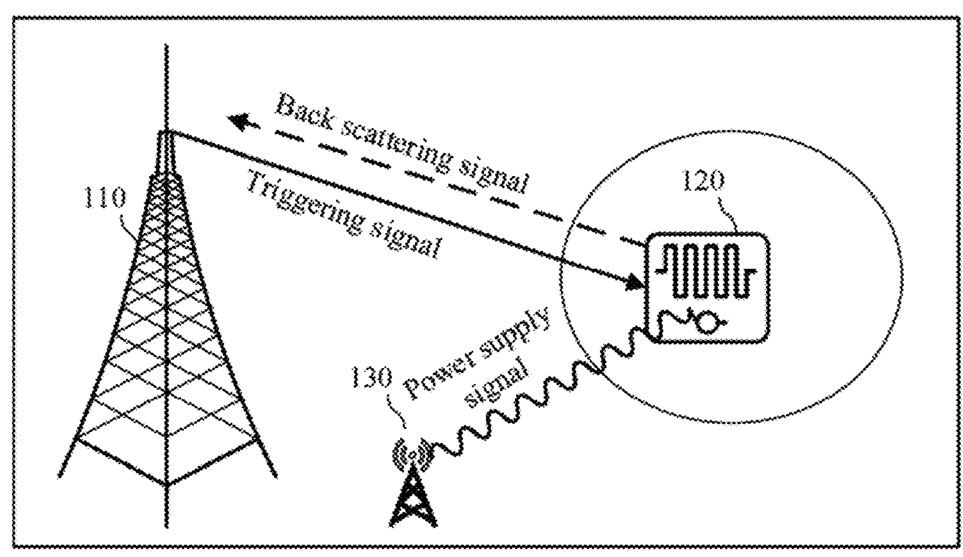
FIG. 1 is a schematic diagram of a communication system provided by an embodiment of the present disclosure.

The technical solutions of the embodiments of the present disclosure will be described below in combination with the drawings in the embodiments of the present disclosure. It is obvious that the described embodiments are part of the embodiments of the present disclosure, but not all of them. With respect to the embodiments in the present disclosure, all other embodiments obtained by those of ordinary skill in the art without making creative efforts fall within the scope of protection of the present disclosure.

It should be understood that the terms "system" and "network" are often used interchangeably in the present disclosure. In the present disclosure, the term "and/or" is merely used to represent an association relationship between associated objects, which indicates that there may be three relationships. For example, A and/or B, may mean that there are three situations: A exists alone, A and B exist simultaneously, and B exists alone. In addition, the character "/" in the present disclosure generally indicates that there is a "or" relationship between the associated objects.

In the description of embodiments of the present disclosure, the term "correspondence" may mean that there is a direct correspondence or an indirect correspondence relationship between the two objects, may also mean that there is an association relationship between the two objects, may also mean that there is a relationship of indicating and being indicated, configuring and being configured, etc.

Embodiments of the present disclosure may be applied to various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Wireless Local Area Networks (WLAN), a Wireless Fidelity (WiFi), a next generation communication system, a zero-power communication system, a cellular Internet of Things, a cellular passive Internet of Things or other communication systems.

The cellular Internet of Things is the development product of the combination of cellular mobile communication network and Internet of Things. The cellular passive Internet of Things is also called passive cellular Internet of Things, which is a combination of a network device and passive terminals. In cellular passive Internet of Things, the passive terminal can communicate with other passive terminal through the network device, or the passive terminals can communicate by a manner of Device to Device (D2D) communication, and the network device only needs to transmit a carrier signal, that is, a power supply signal, to supply power to the passive terminals.

In general, traditional communication systems support a limited number of connections and are easy to implement. However, with the development of communication technology, mobile communication systems will not only support traditional communication, but also support, for example, D2D communication, Machine to Machine (M2M) communication, Machine Type Communication (MTC), Vehicle to Vehicle (V2V) communication, etc. Embodiments of the present disclosure can also be applied to these communication systems.

Alternatively, the communication system in the embodiments of the present disclosure may be applied to a Carrier Aggregation (CA) scenario, a Dual Connectivity (DC) scenario, and a Standalone (SA) network distribution scenario.

The embodiments of the present disclosure are not limited to the spectrum of the application. For example, the embodiments of the present disclosure may be applied to licensed spectrum or unlicensed spectrum.

FIG. 1 is an example of a communication system 100 provided by an embodiment of the present disclosure.

As illustrated in FIG. 1, the communication system 100 may include a network device 110, a terminal device 120 and a power supply node 130. The network device 110 may be a device that communicates with the terminal device 120 (or referred to as a communication terminal, or a terminal). The network device 110 may provide communication coverage for a particular geographic area and may communicate with terminal devices located within the coverage area. For example, the network device 110 may transmit a triggering signal to the terminal device 120, and the triggering signal serves as a signal for information transmission or as a downlink signal in the communication system 100. After receiving the triggering signal, the terminal device 120 transmits a back scattering signal to the network device 110. The back scattering signal may serves as an uplink signal in the communication system 100. The power supply node 130 may provide a power supply signal to the terminal device 120, so that the terminal device 120 performs power harvesting or charging based on the power supply signal. Exemplarily, the power supply node 130 may continuously or intermittently transmit power supply signals in a certain frequency band for power harvesting by the terminal device 120. After the terminal device 120 obtains the power, the terminal device can perform corresponding functions such as signal reception, signal reflection and measurement.

The back scattering signal may be a signal formed by reflecting and/or modulating the triggering signal or the power supply signal. Exemplarily, the terminal device 120 may modulate the power supply signal transmitted by the power supply node 130, thereby transmitting the back scattering signal carrying information and formed by modulating to the network device 120. Alternatively, the power supply signal may be a carrier signal, for example, the power supply signal may be a Continuous Wave (CW), such as a sine wave. The terminal device 120 may use amplitude or phase of the CW to transmit the changed bearer information according to a specific modulation mode. Of course, in other alternative embodiments, the terminal device 120 may also modulate the triggering signal, so as to transmit the back scattering signal carrying information and formed by modulating to the network device 120, which is not limited in the present disclosure.

Exemplarily, the terminal device 120 may perform power harvesting based on the power supply signal.

Alternatively, the carrier of the power supply signal may be a base station, a smart phone, an intelligent gateway, a charging station, a micro base station, etc.

Alternatively, the frequency band of the power supply signal may be a low frequency, an intermediate frequency, a high frequency, etc.

Alternatively, the wave shape of the power supply signal may be a sine wave, a square wave, a triangular wave, a pulse, a rectangular wave, etc.

Alternatively, the power supply signal may be a CW or a non-continuous wave (i.e. a certain time interruption is allowed).

Alternatively, the power supply signal may be a certain signal specified in the 3GPP standard, such as, a SRS, a PUSCH, a PRACH, a PUCCH, a PDCCH, a PDSCH, a PBCH, etc.

Exemplarily, the terminal device 120 may perform back scattering communication based on the received triggering signal. Alternatively, the triggering signal may be used to schedule or trigger the zero-power terminal to perform the back scattering communication. Alternatively, the triggering signal carries the scheduling information of the network device, or the triggering signal is a scheduling signalling or a scheduling signal transmitted by the network device.

Alternatively, the carrier of the triggering signal may be a base station, a smart phone, an intelligent gateway, etc.

Alternatively, the frequency band of the triggering signal may be a low frequency, an intermediate frequency, a high frequency signal, etc.

Alternatively, the wave shape of the triggering signal may be a sine wave, a square wave, a triangular wave, a pulse, a rectangular wave, etc.

Alternatively, the triggering signal may be a CW or a non-continuous wave (i.e. a certain time interruption is allowed).

Alternatively, the triggering signal may be a signal specified in the 3GPP standard, such as, a SRS, a PUSCH, a PRACH, a PUCCH, a PDCCH, a PDSCH, a PBCH and so on. The triggering signal may also be a new signal.

It should be noted that the power supply signal and the triggering signal in the communication system 100 may be two signals or one signal. That is, these two signals may be transmitted in different frequency bands, or they are transmitted at the same frequency point. In other words, the network device 110 and the power supply node 130 may be the same device or two independent devices, which are not limited in the present disclosure.

In addition, FIG. 1 exemplarily illustrates a network device and a terminal device. Alternatively, the communication system 100 may include multiple network devices and other numbers of terminal devices may be included within the coverage area of each network device, which is not limited by embodiments of the present disclosure. Alternatively, the communication system 100 may also include other network entities, such as network controllers, mobility management entities and the like, which are not limited by embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and a terminal device 120 having a communication function, and the network device 110 and the terminal device 120 may be specific devices described above and will not be described here. The communication device may also include other devices in the communication system 100, such as network controllers, mobility management entities and other network entities, which are not limited in the embodiments of the present disclosure.

The embodiments of the present disclosure describe various embodiments in combination with a terminal device and a network device. The network device may be a device for communicating with a mobile device, and the network device may be an Access Point (AP) in a WLAN, a Base Transceiver Station (BTS) in a GSM or CDMA, a NodeB (NB) in a WCDMA, an Evolutional Node B (eNB or eNodeB) in a LTE, or a relay station or an AP, or a network device (gNB) in a vehicle-mounted device, a wearable device and an NR network or a network device in a future evolved PLMN network, etc.

In the embodiments of the present disclosure, the network device provides services for the cell, and the terminal device communicates with the network device through the transmission resources (e.g. frequency domain resources, or spectrum resources) used by the cell. The cell may be a cell corresponding to the network device (e.g. base station), and the cell may belong to a macro base station or a base station corresponding to a Small cell. The Small cell may include a Metro cell, a Micro cell, a Pico cell, a Femto cell, etc. These Small cells have the characteristics of small coverage area and low transmission power, and are suitable for providing high-speed data transmission services.

In the embodiments of the present disclosure, the terminal device may also be referred to as User Equipment (UE), an access terminal, a subscriber unit, a subscriber station, a mobile station, a mobile stage, a remote stage, a remote terminal, a mobile device, a user terminal, a terminal, a wireless communication device, a user agent or a user device, etc. The terminal device may be a STATION (ST) in a WLAN, a cellular telephone, a cordless telephone, a Session Initiation Protocol (SIP) telephone, a Wireless Local Loop (WLL) station, a Personal Digital Processing (PDA) device, a handheld device having a wireless communication function, a computing device or other processing device connected to a wireless modem, a vehicle-mounted device, a wearable device, and a terminal device in the next generation communication system, such as an NR network or a terminal device in a future evolved Public Land Mobile Network (PLMN) network, or a zero-power terminal.

By way of example and not limitation, in embodiments of the present disclosure, the terminal device may also be a wearable device. The wearable device may also be called a wearable intelligent device, which is the general name of wearable devices developed by applying wearable technology to intelligently design daily wear, such as glasses, gloves, watches, clothing and shoes. The wearable device is a portable device that is worn directly on the body or integrated into the clothes or accessories of the user. The wearable device is not only a kind of hardware device, but also realizes powerful functions through software support, data interaction and cloud interaction. Generalized wearable smart devices have characteristics of full functions, large size and realizing complete or partial functions without relying on smart phones, such as a smart watch or smart glasses, and a device that only focus on certain application functions and needs to be used in combination with other devices, such as smart phones, for example, various smart bracelets for monitoring physical signs and smart jewelries.

In order to be convenient to understand the solutions of the present disclosure, the related contents of the zero-power terminal will be explained below.

The zero-power terminal may be understood as a device whose power consumption is lower than a pre-set power consumption. For example, the zero-power terminal includes a passive terminal and even a semi-passive terminal.

Exemplarily, the zero-power terminal has an RFID tag, which is a technology for realizing contactless automatic transmission and identification of tag information by a manner of spatial coupling of radio frequency signals. The RFID tag is also called "radio frequency tag" or "electronic tag". According to different power supply manners, the types of electronic tags may be divided into an active electronic tag, a passive electronic tag and a semi-passive electronic tag. The active electronic tag, also called a self-motivated electronic tag, means that the working power of electronic tag is provided by a battery, and the battery, a memory and an antenna together form the active electronic tag. The active electronic tag is different from passive radio frequency activation mode and transmits information through a set frequency band before the battery is replaced. The passive electronic tag, also called driven electronic tag, does not support built-in battery. When the passive electronic tag approaches a reader, the tag is in the near field range formed by the radiation of the reader antenna. The electronic tag antenna generates induced current through electromagnetic induction, and the induced current drives the electronic tag chip circuit. The chip circuit transmits the identification information stored in the tag to the reader through the electronic tag antenna. The semi-passive electronic tag, also called semi-self-motivated electronic tag, inherits the advantages of small size, light weight, low price and long service life of passive electronic tag. The built-in battery only provides power for a few circuits in the chip when there is no reader access, and only when the reader access, the built-in battery supplies power to the RFID chip, so as to increase the reading and writing distance of the tag and improve the reliability of communication.

The RFID system is a wireless communication system. The RFID system is composed of an electronic TAG and a Reader/Writer. The electronic TAG includes coupling components and chips. Each electronic TAG has a unique electronic code, which is placed on the measured target to mark the target object. The Reader/Writer may not only read the information on the electronic TAG, but also write the information on the electronic TAG, and at the same time provide the power needed for communication for the electronic TAG.

The zero-power communication adopts power harvesting and back scattering communication technology. In order to understand the technical solutions of the embodiments of the present disclosure, the related technology of zero power consumption is explained.

Figure 2:
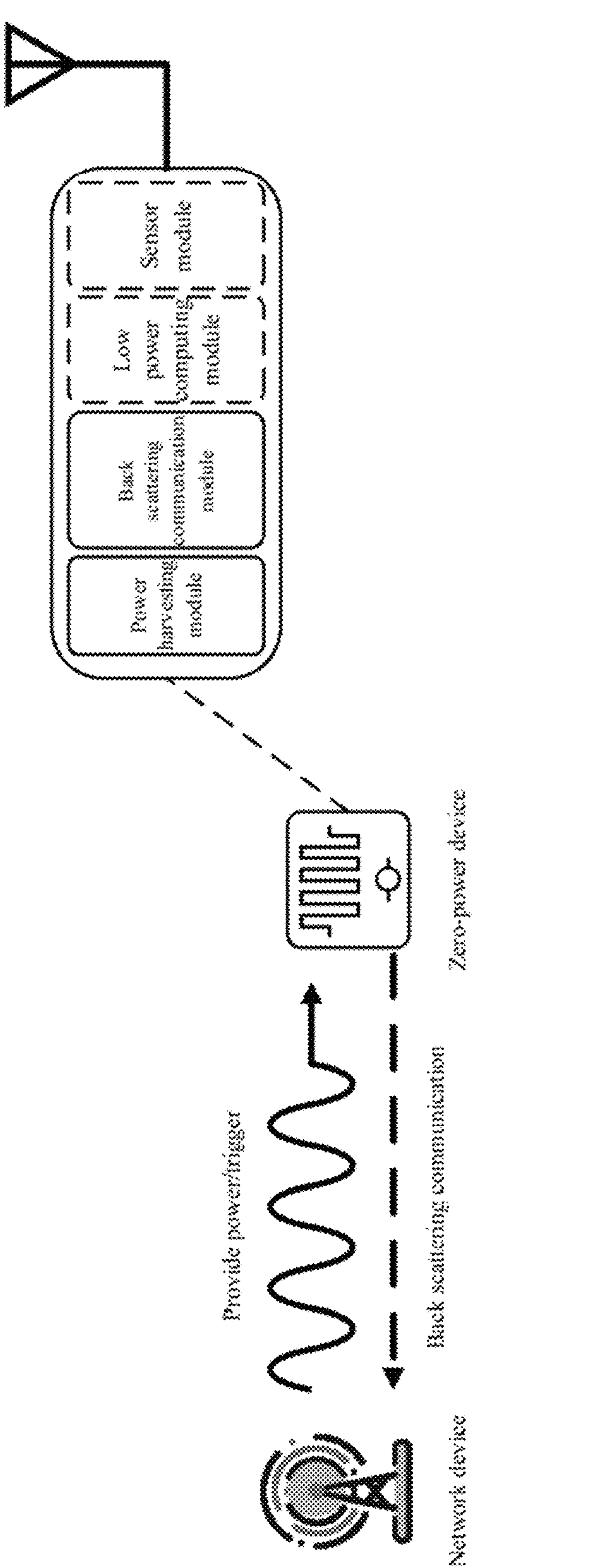
FIG. 2 is a schematic diagram of a zero-power communication system provided by the present disclosure.

FIG. 2 is a schematic diagram of the zero-power communication system provided by the present disclosure.

As illustrated in FIG. 2, the zero-power communication system consists of a network and a zero-power terminal. The network device is used for transmitting a wireless power supply signal and a downlink communication signal and receiving a back scattering signal from the zero-power terminal. A basic zero-power terminal includes a power harvesting module, a back scattering communication module and a low power computing module. In addition, the zero-power terminal may further have a memory or a sensor for storing some basic information (such as object identification, etc.) or obtaining sensing data such as ambient temperature and ambient humidity.

The zero-power communication may also be called communication based on a zero-power terminal. The key technologies of the zero-power communication mainly include Radio Frequency (RF) power harvesting and back scattering communication.

1. RF Power Harvesting.

Figure 3:
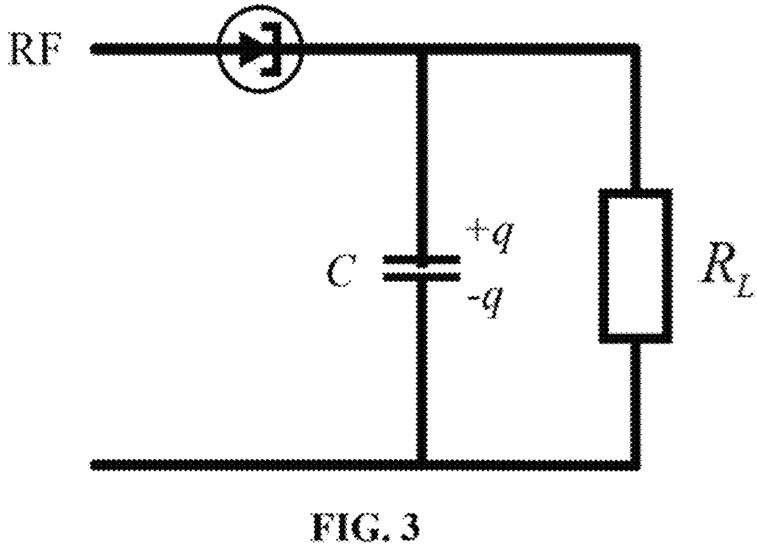
FIG. 3 is a principle diagram of power harvesting provided by an embodiment of the present disclosure.

FIG. 3 is a principle diagram of power harvesting provided by an embodiment of the present disclosure.

As illustrated in FIG. 3, the RF power harvesting module harvest space electromagnetic wave power based on the principle of electromagnetic induction, and then obtains the power needed to drive the zero-power terminal, such as driving the low power demodulation and modulation module, sensors and memory reading. Therefore, the zero-power terminal does not need a traditional battery.

2. Back Scattering Communication.

Figure 4:
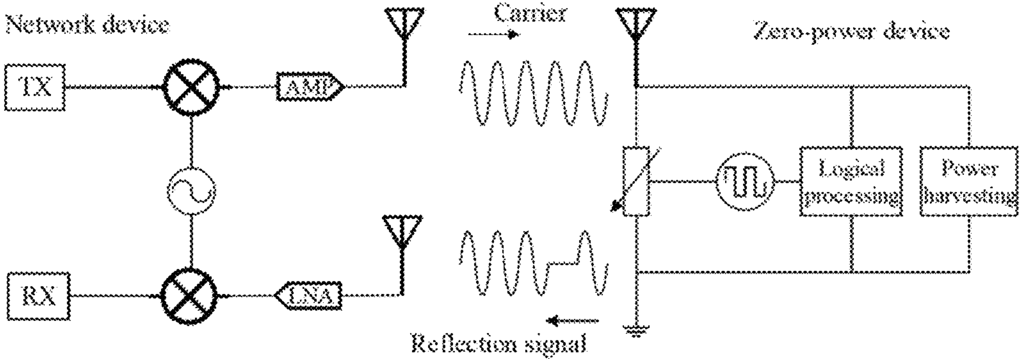
FIG. 4 is a principle diagram of back scattering communication provided by the present disclosure.

FIG. 4 is a principle diagram of back scattering communication provided by the present disclosure.

As illustrated in FIG. 4, the communication zero-power terminal receives a wireless signal transmitted by the network, modulates the wireless signal, loads the information to be transmitted and radiates the modulation signal through the antenna. This information transmission process is called the back scattering communication.

It should be noted that the principle of back scattering communication illustrated in FIG. 4 is explained through a zero-power terminal and a network device, and virtually, any device having the back scattering communication function can realize the back scattering communication.

The back scattering communication and load modulation function are inseparable. The load modulation completes the modulation process by adjusting and controlling the circuit parameters of the oscillation loop of the terminal zero power consumption according to the beat of the data stream, so that the impedance size and phase of the zero-power terminal are changed accordingly. The load modulation technology mainly includes resistance load modulation and capacitance load modulation.

Figure 5:
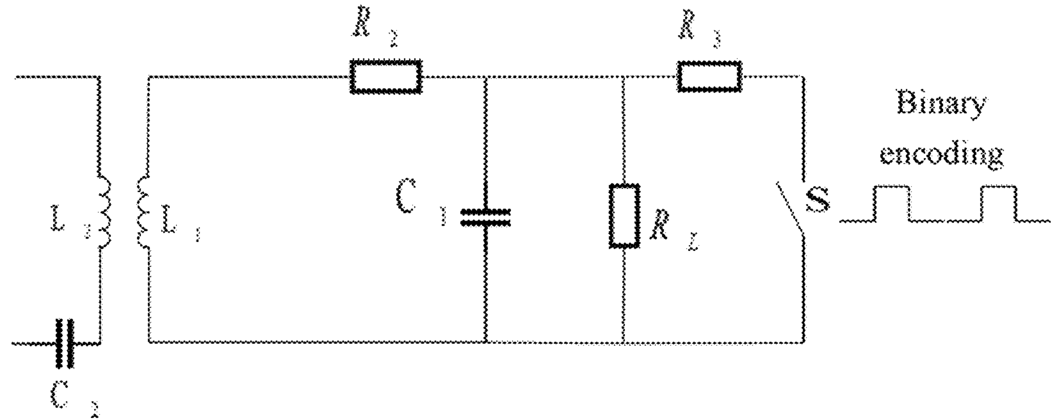
FIG. 5 is a circuit principle diagram of resistance load modulation provided by an embodiment of the present disclosure.

FIG. 5 is a circuit principle diagram of resistance load modulation provided by an embodiment of the present disclosure.

As illustrated in FIG. 5, in resistance load modulation, a resistor is connected in parallel with the load, which is called a load modulation resistor. The resistor is turned on or off based on the control of binary data stream. The turn-on or turn-off of the resistor will lead to the change of circuit voltage, so that Amplitude Shift Keying (ASK) is realized, that is, signal modulation and transmission are realized by adjusting the amplitude of the back scattering signal of the zero-power terminal. Similarly, in capacitance load modulation, the resonant frequency of the circuit may be changed by the turn-on or turn-off of the capacitor, and Frequency Shift Keying (FSK) is realized, that is, the signal modulation and transmission are realized by adjusting the working frequency of the back scattering signal of the zero-power terminal.

Because the zero-power terminal performs information modulation on the incoming signal by means of load modulation to realize the back scattering communication process, the zero-power terminal has significant advantages:

1. The terminal device does not actively transmit signals, and realizes back scattering communication by modulating incoming signals.
2. The terminal device does not rely on the traditional active power amplifier transmitter, and uses a low power computing unit to greatly reduce the hardware complexity.
3. Battery-free communication can be realized by combining power harvesting.

It should be understood that the terminal device may be a zero-power terminal (such as a passive terminal, or even a semi-passive terminal), or even the terminal device may be a terminal with non-zero power consumption, such as an ordinary terminal, but the ordinary terminal may perform the back scattering communication in some cases.

In the specific implementation, the data transmitted by the terminal device may use different forms of codes to represent binary “1” and “0”. The RFID system generally uses one of the following coding methods: Non-Return-to-Zero (NRZ) coding, Manchester coding, Unipolar RZ coding, Differential Binary Phase (DBP) coding, Miller coding and differential coding. Generally speaking, 0 and 1 are represented by different pulse signals.

Exemplarily, the zero-power terminal may be divided into the following types based on the source and usage manner of the power of the zero-power terminal.

1. Passive Zero-Power Terminal

The zero-power terminal does not need a built-in battery. When the zero-power terminal approaches the network device (such as the reader/writer of RFID system), the zero-power terminal is in the near field range formed by the antenna radiation of the network device. Therefore, the antenna of the zero-power terminal generates an induced current through electromagnetic induction, and the induced current drives the low power chip circuit of the zero-power terminal, so as to realize the demodulation of forward link signal and the modulation of backward link signal. For the back scattering link, the zero-power terminal uses the back scattering implementation for signal transmission.

It can be seen from this that passive zero-power terminal does not need built-in battery to drive either forward link or backward link, so it is a true zero-power terminal. The passive zero-power terminal does not need battery, and RF circuit and baseband circuit are very simple, for example, some devices such as a Low Noise Amplifier (LNA), a Power Amplifier (PA), a crystal oscillator and an Analog-to-Digital Converter (ADC) are not needed, so it has many advantages such as small size, light weight, very cheap price and long service life.

2. Semi-Passive Zero-Power Terminal

The semi-passive zero-power terminal does not need to be equipped with a traditional battery, but a RF power harvesting module may be used to harvest radio power and the harvested power is stored in a power storage unit (such as a capacitor). After the power storage unit obtains power, the low power chip circuit of the zero-power terminal may be driven. The demodulation of forward link signal and modulation of backward link signal are realized. For the back scattering link, the zero-power terminal uses the back scattering implementation for signal transmission.

It can be seen that the semi-passive zero-power terminal does not need the built-in battery to drive either the forward link or the backward link. Although the power stored by the capacitor is used in the work, the power comes from the radio power harvested by the power harvesting module, so the semi-passive zero-power terminal is also a true zero-power terminal. The semi-passive zero-power terminal inherits many advantages of the passive zero-power terminal, so it has many advantages such as small size, light weight, very cheap price and long service life.

3. Active Zero-Power Terminal.

In some scenarios, the used zero-power terminal may also be an active zero-power terminal, which can have a built-in battery. The battery is used to drive a low power chip circuit of the zero-power terminal. The demodulation of forward link signal and modulation of backward link signal are realized. However, for the back scattering link, the zero-power terminal uses the back scattering implementation for signal transmission. Therefore, the zero power consumption of this kind of terminal is mainly reflected in the fact that the signal transmission on the backward link does not need the power of the terminal itself, but uses the manner of back scattering. That is to say, the active zero-power terminal supplies power to the RFID chip through the built-in battery, so as to increase the reading and writing distance of the zero-power terminal and improve the reliability of communication. Therefore, it can be applied in some scenes with relatively high requirements on communication distance and reading delay.

With the increase of application demands in the 5G industry, there are more and more types of connectors and application scenarios, and there will be higher requirements for the price and power consumption of communication terminals. The application of passive Internet of Things devices without the need of battery and with low cost has become the key technology of cellular Internet of Things, which can enrich the types and quantity of terminals in the network, and then truly realize the Internet of Everything. The passive Internet of Things devices can be based on existing zero-power terminals, such as a RFID technology, and extended on this basis to be suitable for cellular Internet of Things.

In the cellular network, the traditional terminal device needs a battery to provide power. When the zero-power terminal is introduced into the cellular network, it is necessary to provide the power supply signal through the network device or other power supply nodes for the device with zero power consumption to obtain power. Subsequent communication processes are driven by external power sources. As can be seen from the above, the introduced device with zero power consumption may learn from the RFID technology, that is, the back scattering communication of terminal device modulates the carrier signal (which also plays the role of power supply) transmitted by the network device, so as to transmit the formed back scattering signal carrying information to network device. That is to say, the communication from the terminal to the network device requires the network device to provide the carrier signal.

It should be noted that because of the simple structure, small size and low cost of the device with zero-power consumption, the RFID technology does not support the uplink and downlink time domain structure of the cellular network. Taking the NR system as an example, the cellular network may flexibly configure resources with different frequencies. In the duplex manner of FDD, the network device transmits the signal on the downlink (DL) resource, and accordingly, the terminal device should transmit the signal on the uplink (UL) resource. The DL resource and UL resource are separated by frequencies. However, if the zero-power terminal is applied to the cellular Internet of Things, due to the increase in the number of zero-power terminals and considering the back scattering communication manner of the zero-power terminals, resource conflicts will occur, thus reducing the utilization rate of resources and the reliability of data transmission.

Based on this, the embodiments of the present disclosure provides a method for wireless communication, a terminal device and a network device by considering the duplex manner in the zero-power communication, which not only can apply the zero-power terminal to the cellular Internet of Things to enrich the types and quantity of the linked terminals in the network, thereby truly realizing the Internet of Everything, but also can improve the utilization rate of resources and the reliability of data transmission.

Figure 6:
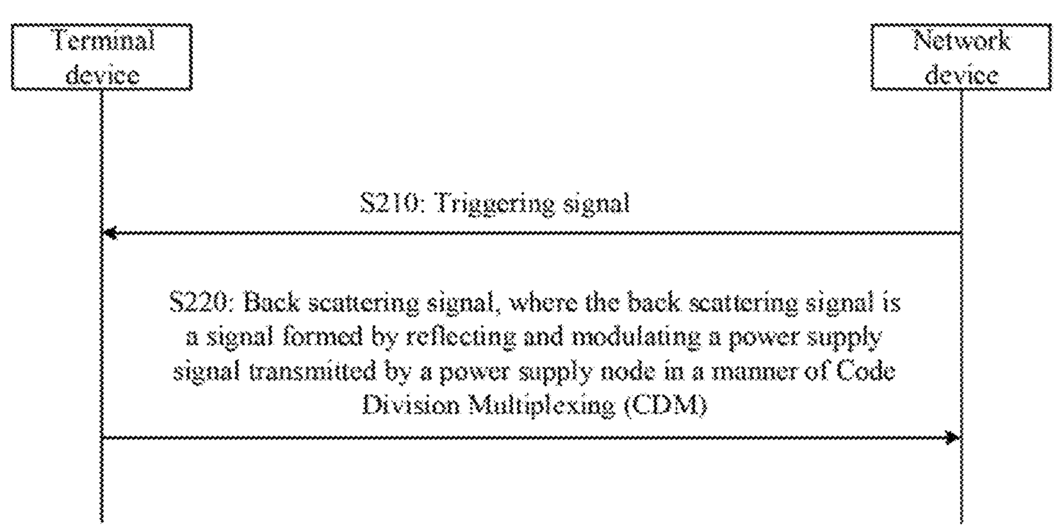
FIG. 6 is a schematic flowchart of a method for wireless communication provided by an embodiment of the present disclosure.

FIG. 6 is a schematic flowchart of a method 200 for wireless communication provided by an embodiment of the present disclosure. The method 200 may be performed by a terminal device, such as a terminal device 120 as illustrated in FIG. 1, or a zero-power terminal.

As illustrated in FIG. 6, the method 200 may include the following operations.

In operation S210, a triggering signal transmitted by a network device is received.

In operation S220, an uplink back scattering signal is transmitted to the network device.

The back scattering signal is a signal formed by reflecting and modulating a power supply signal transmitted by a power supply node in a manner of CDM.

In the embodiment, the back scattering signal is designed as a signal formed by reflecting and modulating the power supply signal transmitted by the power supply node in the manner of CDM, which is beneficial for multiple zero-power terminals to flexibly multiplex the same transmission resources. Furthermore, not only the zero-power terminal can be applied to the cellular Internet of Things to enrich the type and quantity of the linked terminals in the network, thus truly realizing the Internet of Everything, but also the utilization rate of resources and the reliability of data transmission can be improved, and the power utilization efficiency of the zero-power terminal is further improved.

In addition, it is considered that the zero-power terminal operates based on the electromagnetic/inductive coupling of radio, and an internal oscillator is needed to provide and maintain the clock, and the internal oscillator is difficult to ensure an accurate clock from a simplified point of view, so that it is difficult to compensate the distance difference between the terminal device and the network device by timing adjustment. However, if an external electrically coupled power source is used, the stability of the external electrically coupled power source is not as good as that of an active device. In this embodiment, the back scattering signal is designed as a signal formed by reflecting and modulating the power supply signal transmitted by the power supply node in the manner of CDM, which can overcome the timing errors, frequency errors and even phase errors of the terminal device through the CDM modulation mode, thereby improving the system performance.

It should be noted that the network device and the power supply node in this embodiment may be the same device or two independent devices, which is not specifically limited in the present disclosure. As an example, the power supply node is the network device and the triggering signal is carried in the power supply signal. As another example, the power supply node is a device other than the network device and the triggering signal is independent of the power supply signal.

In addition, the present disclosure is not limited to the specific implementation of the power supply signal.

For example, the power supply signal may be a CW signal with a constant amplitude, which includes but not limited to a sine/cosine wave signal, a sawtooth wave signal, a square wave signal and the like. For another example, the power supply signal may be a continuously transmitted power supply signal. For another example, the power supply signal may be a modulated CW signal, such as a signal modulated by a certain amplitude or otherwise.

In addition, the present disclosure is not limited to the modulation mode for modulating the power supply signal.

For example, the power supply signal may be modulated by subcarrier modulation. The subcarrier modulation refers to modulating the signal on carrier 1 firstly, and then modulating it again, that is, modulating another carrier 2 with higher frequency with the modulated carrier of the carrier 1. The subcarrier modulation is a modulation mode used in the RFID system. Specifically, in the subcarrier modulation, a subcarrier with low frequency is firstly modulated with a data signal encoded by the baseband, and the modulated subcarrier signal is used for switching the load resistors. Then, the ASK, FSK or Phase Shift Keying (PSK) modulation method is used to perform secondary modulation on the subcarrier.

Figure 7:
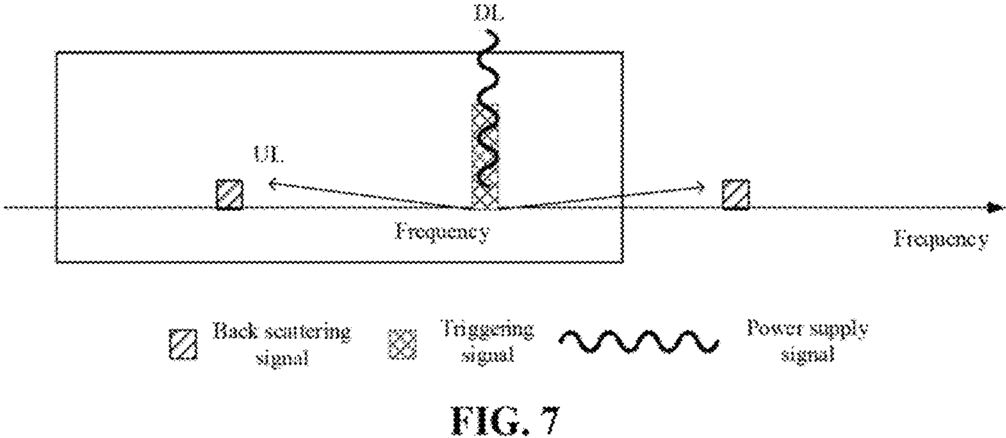
FIG. 7 is a schematic diagram of a generation principle of a back scattering signal provided by an embodiment of the present disclosure.

FIG. 7 is a schematic diagram of a generation principle of a back scattering signal provided by an embodiment of the present disclosure.

As illustrated in FIG. 7, the terminal device provides a triggering signal and a power supply signal through a downlink (DL) frequency. After receiving the power supply signal, the terminal device backscatters the power supply signal to feed back information to the network device at the uplink (UL) frequency. For example, the terminal device transmits a signal formed by reflecting and modulating the power supply signal in the manner of CDM to the network device on the UL frequency. It should be noted that in FIG. 7, the transmitting frequency of the back scattering signal generates symmetrical frequency shift reflection relative to the receiving frequency domain of the triggering signal or the power supply signal. In the specific implementation, only one frequency point may be picked up by filtering and other techniques, and taken as the final transmitting frequency point of the back scattering signal.

In some embodiments, an uplink frame structure used for the back scattering signal includes at least one reflection period, each of the at least one reflection period includes at least one reflection time unit, each of the at least one reflection time unit includes at least one Guard Period (GP) and at least one reflection time segment, and each of the reflection time segment is a transmitting occasion of the back scattering signal.

In other words, the uplink frame structure may consist of at least one reflection period, and the reflection period includes at least one reflection time unit. For example, if the length of the reflection period is y ms, the length of the at least one reflection time unit is y ms. The reflection time unit may also be referred to as an uplink time unit.

Alternatively, the reflection time unit includes a GP and a reflection time segment. The GP is before the reflection time segment.

Alternatively, the reflection time unit includes a GP and a reflection time segment. The GP is after the reflection time segment.

Figure 8:
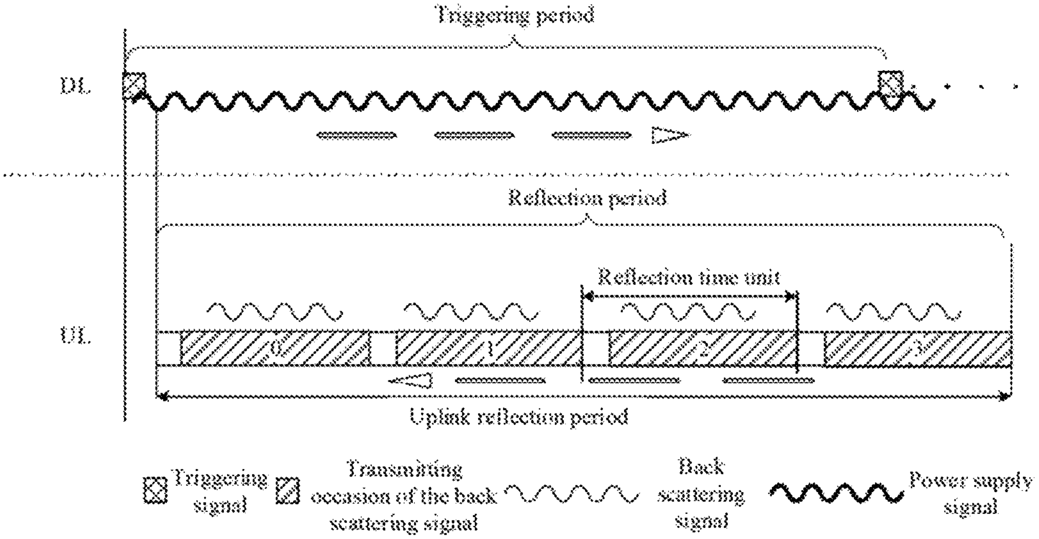
FIG. 8 is a schematic block diagram of a radio frame structure provided by an embodiment of the present disclosure.
Figure 9:
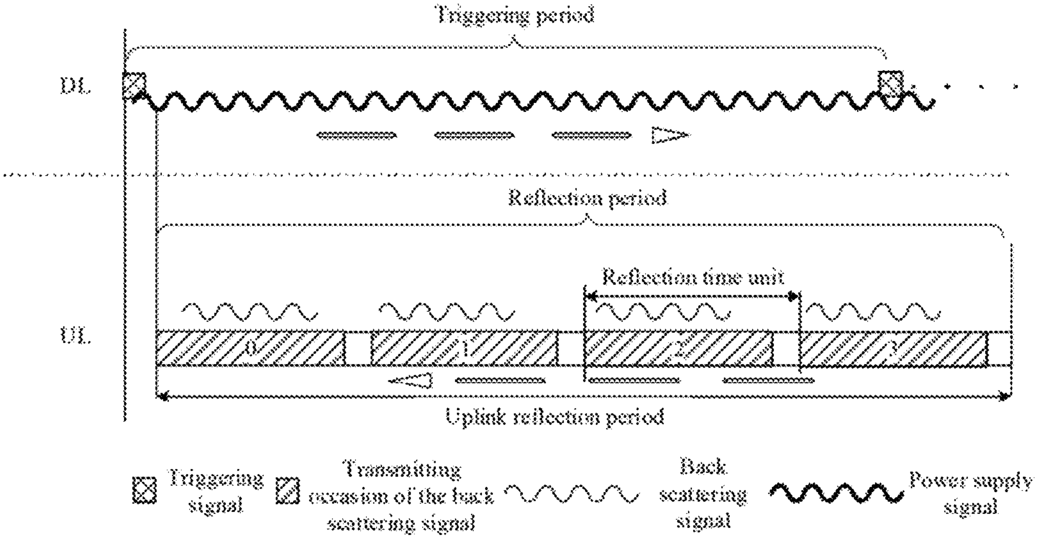
FIG. 9 is a schematic block diagram of a radio frame structure provided by another embodiment of the present disclosure.

FIG. 8 and FIG. 9 are schematic structural diagrams of radio frame structures suitable for the zero-power terminal provided by the embodiments of the present disclosure.

As illustrated in FIG. 8, the back scattering signal is in a reflection time unit. The reflection time unit is composed of a GP and a reflection signal time segment, and the GP is before the reflection time segment. Alternatively, multiple reflection time units constitute a reflection period. The uplink frame structure is constructed based on multiple reflection periods. Alternatively, the length of the reflection period is y ms, and the reflection period includes n reflection time units, y is a positive integer and n is a positive integer.

As illustrated in FIG. 9, the back scattering signal is in a reflection time unit. The reflection time unit is composed of a GP and a reflection signal time segment, and the GP is after the reflection time segment. Alternatively, multiple reflection time units constitute a reflection period. The uplink frame structure is constructed based on multiple reflection periods. Alternatively, the length of the reflection period is y ms, and the reflection period includes n reflection time units, y is a positive integer and n is a positive integer.

It is considered that the zero-power terminal operates based on the electromagnetic/inductive coupling of radio, and an internal oscillator is needed to provide and maintain the clock, and the internal oscillator is difficult to ensure an accurate clock from a simplified point of view, so that it is difficult to compensate the distance difference between the terminal device and the network device by timing adjustment. However, if an external electrically coupled power source is used, the stability of the external electrically coupled power source is not as good as that of an active device. Based on this, in the embodiment, the reflection time unit is designed to include a GP and a reflection time segment, and the GP is before or after the reflection time segment, which can overcome the problem of inconsistent timing advance of multiple users and the like.

Of course, in other alternative embodiments, the reflection time unit may also include at least one GP and at least one reflection time segment, and the at least one GP and the at least one reflection time segment are interleaved. Alternatively, the length of the GP is less than or equal to the length of the reflection time segment. Alternatively, the GP is greater than or equal to the propagation delay.

Alternatively, the at least one reflection period is multiple reflection periods, and the multiple reflection periods are continuous or discontinuous in a time domain.

It should be noted that the embodiments of the present disclosure are not specifically limited to the downlink frame structure used by the triggering signal. For example, the downlink frame structure used by the triggering signal includes at least one triggering period, and the transmitting occasion of the triggering signal includes a triggering time unit within the triggering period. Alternatively, the at least one triggering period is multiple triggering periods, and the multiple triggering periods are continuous or discontinuous in the time domain. Alternatively, the triggering time unit may be located at a start position, an intermediate position, or an end position of the triggering period. Alternatively, the triggering time unit may be used to transmit one or more triggering signals. In other words, the transmitting occasion of the power supply signal includes the triggering time unit. Alternatively, the triggering time unit or the time period may be a symbol, a slot, a subframe or a frame, etc. The power supply node continuously transmits the power supply signal on all or part of the time of the triggering period in the downlink frame structure. In other words, the power supply node may transmit the power supply signal on part or all of the time units in the triggering period.

In some embodiments, the method 200 may further include the following operations.

The first base sequence for a terminal device from multiple base sequences is acquired. The multiple base sequences are respectively used for distinguishing multiple terminal devices, and the multiple terminal devices includes the terminal device.

The reflection and spread-spectrum are performed on the power supply signal in the manner of CDM based on the first base sequence, to obtain the back scattering signal, or the spread-spectrum is performed on a modulation signal in the manner of CDM based on the first base sequence, to obtain the back scattering signal. The modulation signal is a signal formed by reflecting and modulating the power supply signal based on information to be transmitted of the terminal device.

In other words, after acquiring the first base sequence, the terminal device may perform reflection and spread-spectrum on the power supply signal or the modulation signal in the manner of CDM based on the first base sequence, to obtain the back scattering signal. Exemplarily, the terminal device may perform reflection, and at least one of amplitude modulation, phase modulation, or frequency modulation on the power supply signal or the modulation signal in the manner of CDM based on the first base sequence, to obtain the back scattering signal. Alternatively, the modulation signal is a signal formed by performing reflection and subcarrier modulation on the power supply signal based on the information to be transmitted of the terminal device. Alternatively, the modulation signal is a signal formed by performing reflection and load modulation on the power supply signal based on the information to be transmitted of the terminal device.

Alternatively, the terminal device may firstly confirm the length or length range of the base sequence used by the terminal device, and then may determine multiple base sequences based on the length or length range of the base sequence used by the terminal device. Finally, an index of the first base sequence is determined from the multiple base sequences to obtain the first base sequence.

Figure 10:
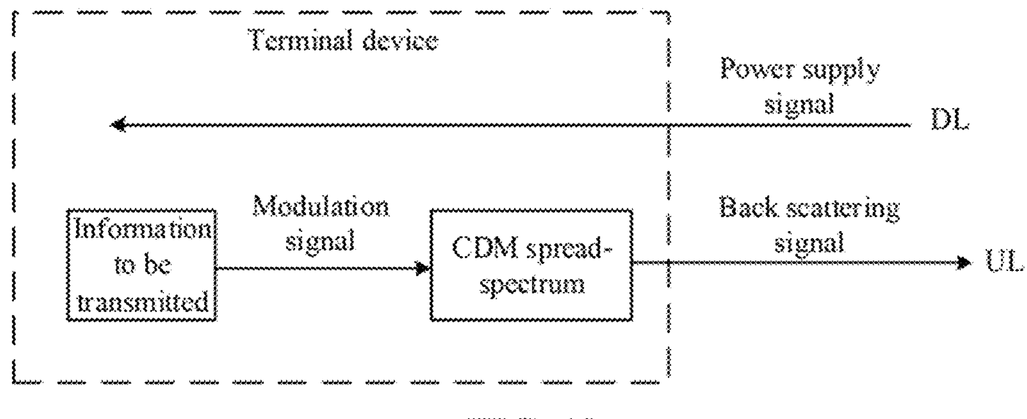
FIG. 10 is an example of performing spread-spectrum on a modulation signal to obtain a back scattering signal provided by an embodiment of the present disclosure.

FIG. 10 is an example of performing spread-spectrum on a modulation signal to obtain a back scattering signal provided by an embodiment of the present disclosure.

As illustrated in FIG. 10, after receiving the power supply signal, the terminal device may perform reflection, load modulation and subcarrier modulation on the power supply signal based on the information to be transmitted of the terminal device to obtain the modulation signal. Then, the terminal device may perform spread-spectrum on the modulation signal in a manner of CDM based on the first base sequence to obtain the back scattering signal. Finally, the terminal device transmits the back scattering signal to the network device.

It should be noted that, in other alternative embodiments, the base sequence referred to in the embodiments of the present disclosure may also be referred to as a specified code, a chip sequence, a spread-spectrum sequence or a modulation sequence, which is not specifically limited in the present disclosure.

In some embodiments, the first base sequence is determined from the multiple base sequences according to all or part of information pre-stored in the terminal device and the number of terminal devices communicating in the manner of CDM.

In other words, the first base sequence is a base sequence determined based on information that can be used to distinguish the terminal device.

Alternatively, the first base sequence is determined according to the following formula: C=m mod k.

In the above formula, C is used to represent the first base sequence, m is used to represent the all or part of the information pre-stored in the terminal device, k is used to represent the number of terminal devices communicating in the manner of CDM, and mod is used to represent an modulo division operation.

It should be noted that C referred to in the embodiments of the present disclosure may be an identification of the first base sequence, for example, C may be an index of the first base sequence, which is not specifically limited in the present disclosure.

Alternatively, the information pre-stored in the terminal device includes an identification of the terminal device.

In other words, the first base sequence is a base sequence determined based on an identification that can be used to distinguish the terminal device.

In some embodiments, the first base sequence is stored in at least one of: a memory, a Subscriber Identification Module (SIM), or an Embedded-SIM (eSIM).

In some embodiments, the first base sequence is indicated by the network device, or the first base sequence is determined by the terminal device, or the first base sequence is predefined.

In some embodiments, the multiple base sequences are predefined.

It should be noted that in the embodiments of the present disclosure, the "predefined" may be implemented by pre-storing corresponding codes, tables or other means that can be used to indicate relevant information in devices (e.g., including the terminal device and the network device), and the specific implementation methods thereof are not limited in the present disclosure. For example, the "predefined" information may refer to what is defined in the protocol. Alternatively, the "protocol" may refer to a standard protocol in the communication field, and may include, for example, an LTE protocol, an NR protocol, and related protocols applied in future communication systems, which are not specifically limited in the present disclosure.

In some embodiments, the cross-correlations among different base sequences in the multiple base sequences are less than or equal to the first threshold, and/or an autocorrelation of each of the multiple base sequences is greater than or equal to the second threshold.

Alternatively, the time domain cyclic autocorrelation of each of the multiple base sequences is greater than or equal to the second threshold.

It should be noted that the specific values of the first threshold and the second threshold are not limited in the present disclosure. For example, the first threshold and/or the second threshold may be determined based on actual requirements or the number of terminals communicating in a manner of CDM.

In some embodiments, the multiple base sequences include a Discrete Fourier Transformation (DFT) sequence or a pseudo random sequence.

Alternatively, the pseudo random sequence includes at least one of an M sequence or a Gold sequence.

Alternatively, the multiple base sequences may be multiple DFT sequences. For example, the multiple DFT sequences may be illustrated in Table 1.

TABLE 1

| i = 0 | i = 1 | i = 2 | i = 3 |
|---|---|---|---|
| [0] | — | — | — |
| [0 0] | [0 1] | — | — |
| [0 0 0] | [0 1 2] | [0 2 1] | — |
| [0 0 0 0] | [0 2 0 2] | [0 0 2 2] | [0 2 2 0] |

As illustrated in Table 1, i may represent an index of the first base sequence. The maximum value of i is the sequence length of the base sequence minus 1. For example, assuming that the sequence length of the multiple base sequences is 4, i.e. the terminal device uses a base sequence with a length of 4, the multiple base sequences include [0 0 0 0], [0 2 0 2], [0 0 2 2], and [0 2 2 2]. In this case, if the index of the first base sequence is determined to be 3, the first base sequence is [0 2 2 0]. The specific values in the base sequence may represent the phase shift coefficient. For example, taking [0 2 2 0] as an example, [0 2 2 0] means that the phase shifts of the power supply signal or the modulation signal are 0, (2/4)*2π, (2/4)*2π, and 0, respectively, when the reflection and spread-spectrum are performed on the power supply signal or the modulation signal.

In some embodiments, the back scattering signal is a signal formed by reflecting and modulating the power supply signal in the manner of CDM and a manner of Frequency Division Duplex (FDD).

In some embodiments, the operation S220 may include the following operations.

A second frequency band is determined according to a first offset and a first frequency band. The first frequency band is at least one of a frequency band where the triggering signal is located or a frequency band where the power supply signal is located.

The back scattering signal is transmitted to the network device on the second frequency band.

Alternatively, the first offset is indicated by the network device, or the first offset is determined by the terminal device, or the first offset is predefined.

In other words, the terminal device reflects the power supply signal to the uplink frequency band with a frequency shift of value k to obtain the back scattering signal. Alternatively, k is a fixed value or is generated based on information of the terminal. In the embodiment, when a position conflict occurs among multiple users in the frequency domain, users can be further distinguished by the manner of CDM, thereby improving the multiplexing capacity.

In some embodiments, the back scattering signal is a signal formed by reflecting and modulating the power supply signal in the manner of CDM and a manner of Time Division Duplex (TDD).

In some embodiments, the operation S220 may include the following operations.

A second reflection time unit is determined according to a second offset and a first reflection time unit. The first reflection time unit is at least one of a frequency band where the triggering signal is located or a reflection time unit where the power supply signal is located.

The back scattering signal is transmitted to the network device on the second reflection time unit.

Alternatively, the second offset is indicated by the network device, or the second offset is determined by the terminal device, or the second offset is predefined.

In other words, the terminal device reflects the power supply signal to the uplink frequency band with a time offset of value r to obtain the back scattering signal. Alternatively, k is a fixed value or is generated based on information of the terminal. In this embodiment, when a position conflict occurs among multiple users in the time, users can be further distinguished by the manner of CDM, thereby improving the multiplexing capacity.

Preferred embodiments of the present disclosure have been described in detail with reference to the drawings, but the present disclosure is not limited to the specific details of the above embodiments. Within the scope of the technical conception of the present disclosure, various simple modifications may be made to the technical solutions of the present disclosure, and these simple modifications all belong to the scope of protection of the present disclosure. For example, each of the specific technical features described in the above specific embodiments may be combined in any suitable manner without contradiction, and various possible combinations are not further described in the present disclosure in order to avoid unnecessary repetition. For another example, any combination may be made between the various embodiments of the present disclosure as long as it does not depart from the idea of the present disclosure and is likewise to be regarded as the disclosure of the present application.

It should also be understood that in the various method embodiments of the present disclosure, the size of the sequence number of the above-mentioned processes does not mean the order of execution, and the execution order of the processes should be determined by their functions and inherent logic, and should not be defined in any way by the implementation process of the embodiments of the present disclosure. Further, in the embodiments of the present disclosure, the terms "downlink" and "uplink" are used to represent the transmission direction of the signal or data. The "downlink" is used to represent the transmission direction of the signal or data as the first direction transmitted from the station to the UE of the cell, and the "uplink" is used to represent the transmission direction of the signal or data as the second direction transmitted from the UE of the cell to the station. For example, the "downlink signal" means that the transmission direction of the signal is a first direction. In addition, in the embodiments of the present disclosure, the term "and/or" is merely used to represent an association relationship between associated objects, which indicates that there may be three relationships. Specifically, A and/or B, may mean that there are three situations: A exists alone, A and B exist simultaneously, and B exists alone. In addition, the character "/" in the present disclosure generally indicates that there is a "or" relationship between the associated objects.

The method embodiments of the present disclosure are described in detail above in communication with FIG. 6 to FIG. 8. The apparatus embodiments of the present disclosure are described in detail below in combination with FIG. 11 to FIG. 14.

Figure 11:
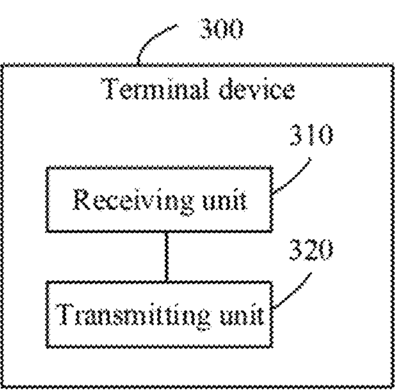
FIG. 11 is a schematic block diagram of a terminal device provided by an embodiment of the present disclosure.

FIG. 11 is a schematic block diagram of a terminal device 300 according to an embodiment of the present disclosure.

As illustrated in FIG. 11, the terminal device 300 may include a receiving unit 310 and a transmitting unit 320.

The receiving unit 310 is configured to receive a triggering signal transmitted by a network device.

The transmitting unit 320 is configured to transmit a back scattering signal to the network device.

The back scattering signal is a signal formed by reflecting and modulating a power supply signal transmitted by a power supply node in a manner of CDM.

In some embodiments, an uplink frame structure used for the back scattering signal includes at least one reflection period, each of the at least one reflection period includes at least one reflection time unit, each of the at least one reflection time unit includes at least one GP and at least one reflection time segment, and each of the reflection time segment is a transmitting occasion of the back scattering signal.

In some embodiments, the reflection time unit includes a GP and a reflection time segment. The GP is before the reflection time segment, or the GP is after the reflection time segment.

In some embodiments, the at least one reflection period is multiple reflection periods, and the multiple reflection periods are continuous or discontinuous in a time domain.

In some embodiments, the transmitting unit 320 is further configured to acquire the first base sequence for a terminal device from multiple base sequences and perform reflection and spread-spectrum on the power supply signal in the manner of CDM based on the first base sequence, to obtain the back scattering signal, or perform spread-spectrum on a modulation signal in the manner of CDM based on the first base sequence, to obtain the back scattering signal, where the multiple base sequences are respectively used for distinguishing multiple terminal devices, and the multiple terminal devices include the terminal device, and the modulation signal is a signal formed by reflecting and modulating the power supply signal based on information to be transmitted of the terminal device.

In some embodiments, the transmitting unit 320 is specifically configured to determine the first base sequence from the multiple base sequences according to all or part of information pre-stored in the terminal device and a number of terminal devices communicating in the manner of CDM.

In some embodiments, the transmitting unit 320 is specifically configured to determine the first base sequence according to following formula: C=m mod k.

In the above formula, C is used to represent the first base sequence, m is used to represent the all or part of the information pre-stored in the terminal device, k is used to represent the number of terminal devices communicating in the manner of CDM, and mod is used to represent an modulo division operation.

In some embodiments, the information pre-stored in the terminal device includes an identification of the terminal device.

In some embodiments, the first base sequence is stored in at least one of: a memory, an SIM, or an eSIM.

In some embodiments, the first base sequence is indicated by the network device, or the first base sequence is determined by the terminal device, or the first base sequence is predefined.

In some embodiments, the multiple base sequences are predefined.

In some embodiments, cross-correlations among different base sequences in the multiple base sequences are less than or equal to the first threshold, and/or an autocorrelation of each of the multiple base sequences is greater than or equal to the second threshold.

In some embodiments, the multiple base sequences include a DFT sequence or a pseudo random sequence.

In some embodiments, the pseudo random sequence includes at least one of an M sequence or a Gold sequence.

In some embodiments, the back scattering signal is a signal formed by reflecting and modulating the power supply signal in the manner of CDM and a manner of FDD.

In some embodiments, the transmitting unit 320 is specifically configured to determine a second frequency band according to the first offset and the first frequency band and transmit, on the second frequency band, the back scattering signal to the network device. The first frequency band is at least one of a frequency band where the triggering signal is located or a frequency band where the power supply signal is located.

In some embodiments, the first offset is indicated by the network device, or the first offset is determined by a terminal device, or the first offset is predefined.

In some embodiments, the back scattering signal is a signal formed by reflecting and modulating the power supply signal in the manner of CDM and a manner of TDD.

In some embodiments, the transmitting unit 320 is specifically configured to determine the second reflection time unit according to the second offset and the first reflection time unit and transmit, on the second reflection time unit, the back scattering signal to the network device. The first reflection time unit is at least one of a frequency band where the triggering signal is located or a reflection time unit where the power supply signal is located.

In some embodiments, the second offset is indicated by the network device, or the second offset is determined by a terminal device, or the second offset is predefined.

It should be understood that apparatus embodiments and method embodiments may correspond to each other and similar descriptions may refer to method embodiments. In particular, the terminal device 300 illustrated in FIG. 11 may correspond to a corresponding body in the method 200 for performing the embodiment of the present disclosure, and the foregoing and other operations and/or functions of the various units in the terminal device 300 are used to implement the corresponding flow in the various methods in FIG. 6, which are not repeated here for the sake of brevity.

Figure 12:
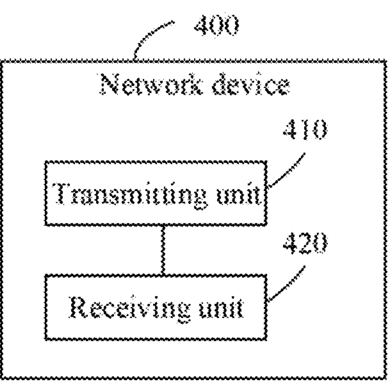
FIG. 12 is a schematic block diagram of a network device provided by an embodiment of the present disclosure.

FIG. 12 is a schematic block diagram of a network device 400 according to an embodiment of the present disclosure.

As illustrated in FIG. 12, the network device 400 may include a transmitting unit 410 and a receiving unit 420.

The transmitting unit 410 is configured to transmit a triggering signal to a terminal device.

The receiving unit 420 is receiving a back scattering signal transmitted by the terminal device.

The back scattering signal is a signal formed by reflecting and modulating a power supply signal transmitted by a power supply node in a manner of CDM.

In some embodiments, an uplink frame structure used for the back scattering signal includes at least one reflection period, each of the at least one reflection period includes at least one reflection time unit, each of the at least one reflection time unit includes at least one GP and at least one reflection time segment, and each of the reflection time segment is a transmitting occasion of the back scattering signal.

In some embodiments, the reflection time unit includes a GP and a reflection time segment. The GP is before the reflection time segment, or the GP is after the reflection time segment.

In some embodiments, the at least one reflection period is multiple reflection periods, and the multiple reflection periods are continuous or discontinuous in a time domain.

In some embodiments, the receiving unit 420 is further configured to acquire the first base sequence for the terminal device from multiple base sequences, and demodulate the back scattering signal in the manner of CDM based on the first base sequence, to obtain a demodulated signal. The multiple base sequences are respectively used for distinguishing multiple terminal devices, and the multiple terminal devices include the terminal device.

In some embodiments, the receiving unit 420 is specifically configured to determine the first base sequence from the multiple base sequences according to all or part of information pre-stored in the terminal device and a number of terminal devices communicating in the manner of CDM.

In some embodiments, the receiving unit 420 is specifically configured to determine the first base sequence according to following formula: C=m mod k.

In the above formula, C is used to represent the first base sequence, m is used to represent the all or part of the information pre-stored in the terminal device, k is used to represent the number of terminal devices communicating in the manner of CDM, and mod is used to represent an modulo division operation.

In some embodiments, the information pre-stored in the terminal device includes an identification of the terminal device.

In some embodiments, the first base sequence is stored in at least one of: a memory, an SIM, or an eSIM.

In some embodiments, the first base sequence is indicated by a network device, or the first base sequence is determined by the terminal device, or the first base sequence is predefined.

In some embodiments, the multiple base sequences are predefined.

In some embodiments, cross-correlations among different base sequences in the multiple base sequences are less than or equal to the first threshold, and/or an autocorrelation of each of the multiple base sequences is greater than or equal to the second threshold.

In some embodiments, the multiple base sequences include a DFT sequence or a pseudo random sequence.

In some embodiments, the pseudo random sequence includes at least one of an M sequence or a Gold sequence.

In some embodiments, the back scattering signal is a signal formed by reflecting and modulating the power supply signal in the manner of CDM and a manner of FDD.

In some embodiments, the receiving unit 420 is specifically configured to determine the second frequency band according to the first offset and the first frequency band and receive, on the second frequency band, the back scattering signal transmitted by the terminal device. The first frequency band is at least one of a frequency band where the triggering signal is located or a frequency band where the power supply signal is located.

In some embodiments, the first offset is indicated by a network device, or the first offset is determined by the terminal device, or the first offset is predefined.

In some embodiments, the back scattering signal is a signal formed by reflecting and modulating the power supply signal in the manner of CDM and a manner of TDD.

In some embodiments, the receiving unit 420 is specifically configured to determine the second reflection time unit according to the second offset and the first reflection time unit and receive, on the second reflection time unit, the back scattering signal transmitted by the terminal device. The first reflection time unit is at least one of a frequency band where the triggering signal is located or a reflection time unit where the power supply signal is located.

In some embodiments, the second offset is indicated by a network device, or the second offset is determined by the terminal device, or the second offset is predefined.

It should be understood that apparatus embodiments and method embodiments may correspond to each other and similar descriptions may refer to method embodiments. In particular, the network device 400 illustrated in FIG. 12 may correspond to a corresponding body in the method 200 for performing the embodiment of the present disclosure, and the foregoing and other operations and/or functions of the various units in the network device 400 are used to implement the corresponding flow in the various methods in FIG. 6, which are not repeated here for the sake of brevity.

The communication devices of the embodiments of the present disclosure are described above from the perspective of function modules with reference to the drawings. It should be understood that the function modules may be implemented in hardware form, by instructions in software form, or by a combination of hardware and software modules. In particular, each step of the method embodiments in the embodiments of the present disclosure may be completed by the integrated logic circuit of the hardware in the processor and/or the instruction in the form of software, and the steps of the methods disclosed in combination with the embodiments of the present disclosure may be directly embodied as the execution of the hardware decoding processor or the combined execution of the hardware and software modules in the decoding processor. Alternatively, the software module may be located in RAM, flash memory, read-only memory, programmable read-only memory, electrically erasable programmable memory, registers and other storage medium mature in the art. The storage medium is located in the memory, and the processor reads the information in the memory and completes the steps in the method embodiments in combination with its hardware.

For example, the receiving unit 310, the transmitting unit 320, the transmitting unit 410 and the receiving unit 420 described above may all be implemented by a transceiver.

Figure 13:
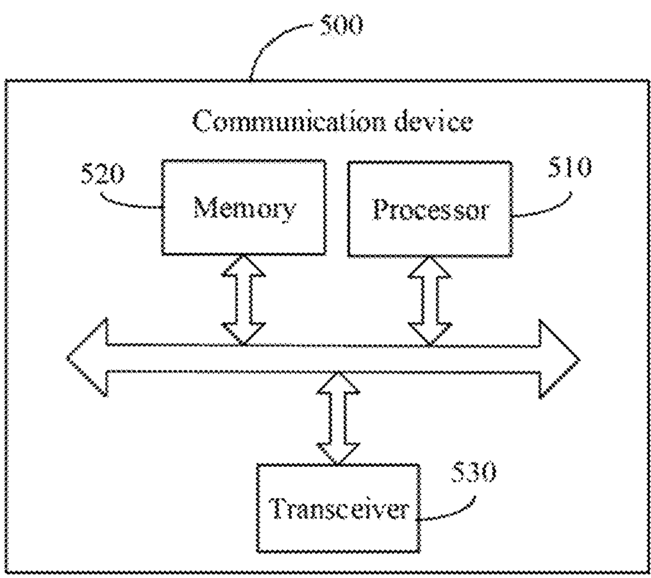
FIG. 13 is a schematic block diagram of a communication device provided by an embodiment of the present disclosure.

FIG. 13 is a schematic structural diagram of a communication device 500 according to an embodiment of the present disclosure.

As illustrated in FIG. 13, the communication device 500 may include a processor 510.

The processor 510 may invoke and run a computer program from the memory to implement the method in the embodiments of the present disclosure.

As illustrated in FIG. 13 the communication device 500 may also include a memory 520.

The memory 520 may be configured to store indication information and may also be configured to store codes instructions and the like executed by the processor 510. The processor 510 may invoke and run a computer program from the memory 520 to implement the method in the embodiments of the present disclosure. The memory 520 may be a separate device independent of the processor 510 or may be integrated within the processor 510.

As illustrated in FIG. 13, the communication device 500 may also include a transceiver 530.

The processor 510 may control the transceiver 530 to communicate with other devices and in particular, may transmit information or data to or receive information or data transmitted by other devices. The transceiver 530 may include a transmitter and a receiver. The transceiver 530 may further include antennas, and the number of antennas may be one or more.

It should be understood that the various components in the communication device 500 are connected by a bus system, and the bus system includes a power bus, a control bus and a status signal bus in addition to a data bus.

It should also be understood that the communication device 500 may be a terminal device in the embodiments of the present disclosure, and the communication device 500 may implement the corresponding flow implemented by the terminal device in the various methods of the embodiments of the present disclosure. That is, the communication device 500 of the embodiment of the present disclosure may correspond to the terminal device 300 in the embodiment of the present disclosure, and may correspond to the corresponding body for performing the method 200 according to the embodiments of the present disclosure, which will not be repeated here for the sake of brevity. Similarly, the communication device 500 may be a network device in the embodiments of the present disclosure, and the communication device 500 may implement corresponding flow implemented by the network device in various methods of the embodiments of the present disclosure. That is, the communication device 500 of the embodiment of the present disclosure may correspond to the network device 400 of the embodiment of the present disclosure, and may correspond to a corresponding body for performing the method 200 according to the embodiments of the present disclosure, which will not be repeated here for the sake of brevity.

In addition, the embodiment of the present disclosure also provides a chip.

For example, the chip may be an integrated circuit chip having signal processing capabilities that can implement or perform the methods, steps and logic diagrams disclosed in the embodiments of the present disclosure. The chip may also be referred to as a system level chip, system chip, chip system or system on a chip etc. Alternatively, the chip may be applied to various communication devices, so that the communication devices mounted with the chip can perform the methods, steps and logic block diagrams disclosed in the embodiments of the present disclosure.

Figure 14:
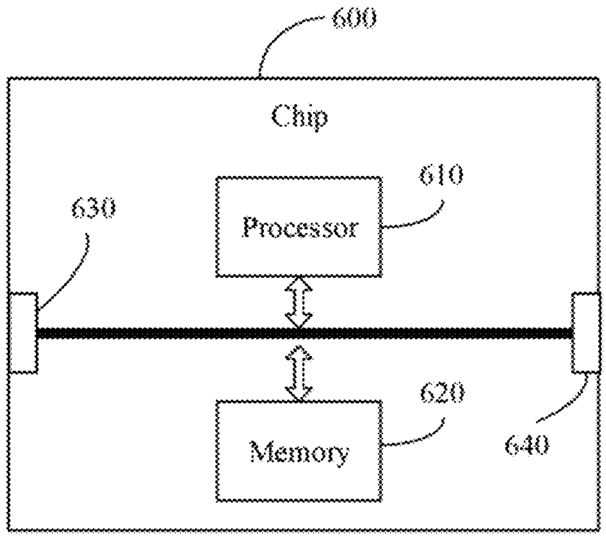
FIG. 14 is a schematic block diagram of a chip provided by an embodiment of the present disclosure.

FIG. 14 is a schematic structural diagram of a chip 600 according to the embodiments of the present disclosure.

As illustrated in FIG. 14, the chip 600 includes a processor 610.

The processor 610 may invoke and run a computer program from the memory to implement the method in the embodiments of the present disclosure.

As illustrated in FIG. 14, the chip 600 may further include a memory 620.

The processor 610 may invoke and run a computer program from the memory 620 to implement the method in the embodiments of the present disclosure. The memory 620 may be configured to store indication information and may also be configured to store codes, instructions and the like performed by the processor 610. The memory 620 may be a separate device independent of the processor 610 or may be integrated within the processor 610.

As illustrated in FIG. 14, the chip 600 may further include an input interface 630.

The processor 610 may control the input interface 630 to communicate with other devices or chips and in particular, may obtain information or data transmitted by other devices or chips.

As illustrated in FIG. 14, the chip 600 may further include an output interface 640.

The processor 610 may control the output interface 640 to communicate with other devices or chips and in particular, may output information or data to other devices or chips.

It should be understood that the chip 600 may be applied to the network device in the embodiments of the present disclosure and may implement the corresponding flow implemented by the network device in the various methods of the embodiment of the present disclosure, and may also implement the corresponding flow implemented by the terminal device in the various methods of the embodiment of the present disclosure, which will not be repeated here for the sake of brevity.

It should also be understood that the various components in the chip 600 are connected by a bus system, and the bus system includes a power bus, a control bus and a status signal bus in addition to a data bus.

The processors referred to above may include, but are not limited to General purpose processor, Digital Signal Processor (DSP), Application Specific Integrated Circuit (ASIC), Field Programmable Gate Array (FPGA) or other programmable logic devices, discrete gate or transistor logic devices, discrete hardware components and so on.

The processor may be used to implement or perform the methods, steps, and logic diagrams disclosed in the embodiments of the present disclosure. The steps of the method disclosed in combination with the embodiment of the present disclosure may be directly embodied as the execution of the hardware decoding processor or the combined execution of the hardware and software modules in the decoding processor. The software module may be located in random access memory, flash memory, read only memory, programmable read only memory or erasable programmable memory, registers and other storage medium mature in the art. The storage medium is located in the memory, and the processor reads the information in the memory and completes the steps of the method in combination with its hardware.

The memory referred to above includes, but is not limited to Volatile memory and/or non-volatile memory. The non-volatile memory may be Read-Only Memory (ROM), Programmable ROM (PROM), Erasable PROM (EPROM), Electrically Erasable EPROM (EEPROM), or flash memory. The volatile memory may be a Random Access Memory (RAM) which serves as an external cache. By way of illustration, but not limitation, many forms of RAM are available, such as static RAM (SRAM), dynamic RAM (DRAM), synchronous DRAM (SDRAM), Double Data Rate SDRAM (DDR SDRAM), Enhanced SDRAM (ESDRAM), synchronous link DRAM (SLDRAM), and Direct Rambus RAM (DR RAM).

It should be noted that the memory described in the present disclosure is intended to include these and any other suitable types of memory.

The embodiments of the present disclosure also provide a computer readable storage medium for storing computer programs. The computer readable storage medium stores one or more programs including instructions that, when executed by a portable electronic device including multiple application programs, enable the portable electronic device to perform the method for wireless communication provided in the present disclosure. Alternatively, the computer readable storage medium may be applied to the network device in the embodiment of the present disclosure, and the computer program causes the computer to perform the corresponding flow implemented by the network device in the various methods of the embodiment of the present disclosure, which is not repeated here for the sake of brevity. Alternatively, the computer readable storage medium may be applied to the mobile terminal/terminal device in the embodiments of the present disclosure, and the computer program causes the computer to perform corresponding processes implemented by the mobile terminal/terminal device in the various methods of the embodiments of the present disclosure, which will not be repeated here for the sake of brevity.

The embodiments of the present disclosure also provide a computer program product, which including a computer program. Alternatively, the computer program product may be applied to the network device in the embodiments of the present disclosure, and the computer program causes the computer to perform the corresponding flow implemented by the network device in the various methods of the embodiment of the present disclosure, which is not repeated here for the sake of brevity. Alternatively, the computer program product may be applied to the mobile terminal/terminal device in the embodiments of the present disclosure, and the computer program causes the computer to perform the corresponding flow implemented by the mobile terminal/terminal device in the various methods of the embodiment of the present disclosure, which is not repeated here for the sake of brevity.

The embodiments of the present disclosure also provide a computer program. When the computer program is executed by the computer, the computer may perform the method for wireless communication provided in the present disclosure. Alternatively, the computer program may be applied to the network device in the embodiments of the present disclosure, and when the computer program is run on the computer, the computer performs the corresponding flow implemented by the network device in the various methods of the embodiment of the present disclosure, which is not repeated here for the sake of brevity. Alternatively, the computer program may be applied to the mobile terminal/terminal device in the embodiments of the present disclosure, and when the computer program is run on the computer, the computer performs the corresponding flow implemented by the mobile terminal/terminal device in the various methods of the embodiment of the present disclosure, which is not be repeated here for the sake of brevity.

The embodiments of the present disclosure also provide a communication system, and the communication system may include the above-mentioned terminal device and the network device to form the communication system 100 as illustrated in FIG. 1, which will not be repeated here for the sake of brevity. It should be noted that the term "system" in the present disclosure may also be referred to as "network management architecture" or "network system".

The embodiments of the present disclosure provide a method for wireless communication, a terminal device and a network device, which can not only apply the zero-power terminal to the cellular Internet of Things to enrich the types and quantity of the linked terminals in the network, thereby truly realizing the Internet of Everything, but also improve the utilization rate of resources and the reliability of data transmission, and further improve the power utilization efficiency of the zero-power terminal.

In the first aspect, the present disclosure provides a method for wireless communication. The method includes the following operations.

A triggering signal transmitted by a network device is received.

A back scattering signal is transmitted to the network device.

The back scattering signal is a signal formed by reflecting and modulating a power supply signal transmitted by an power supply node in a manner of Code Division Multiplexing (CDM).

In the second aspect, the present disclosure provides a method for wireless communication. The method includes the following operations.

A triggering signal is transmitted to a terminal device.

A back scattering signal transmitted by the terminal device is received.

The back scattering signal is a signal formed by reflecting and modulating a power supply signal transmitted by a power supply node in a manner of CDM.

In the third aspect, the present disclosure provides a terminal device. The terminal device is configured to perform the method in the above first aspect or various implementations thereof. In particular, the terminal device includes function modules for performing the method in the above first aspect or various implementations thereof.

In one implementation, the terminal device may include a processing unit, and the processing unit is configured to perform functions related to information processing. For example, the processing unit may be a processor.

In one implementation, the terminal device may include a transmitting unit and/or a receiving unit. The transmitting unit is configured to perform functions related to transmitting, and the receiving unit is configured to perform functions related to reception. For example, the transmitting unit may be a transmitting machine or a transmitter, and the receiving unit may be a receiving machine or a receiver. For another example, the terminal device is a communication chip, the receiving unit may be an input circuit or an interface of the communication chip, and the transmitting unit may be an output circuit or an interface of the communication chip.

In the fourth aspect, the present disclosure provides a network device. The network device is configured to perform the method in the above second aspect or various implementations thereof. In particular, the network device includes function modules for performing the method in the second aspect or various implementations thereof.

In one implementation, the network device may include a processing unit, and the processing unit is configured to perform functions related to information processing. For example, the processing unit may be a processor.

In one implementation, the network device may include a transmitting unit and/or a receiving unit. The transmitting unit is configured to perform functions related to transmitting, and the receiving unit is configured to perform functions related to reception. For example, the transmitting unit may be a transmitting machine or a transmitter and the receiving unit may be a receiving machine or a receiver. For another example, the network device is a communication chip, the receiving unit may be an input circuit or an interface of the communication chip, and the transmitting unit may be an output circuit or an interface of the communication chip.

In the fifth aspect, the present disclosure provides a terminal device including a processor and a memory. The memory is configured to store a computer program, and the processor is configured to invoke and run the computer program stored in the memory to perform the method in the above first aspect or various implementations thereof.

In one implementation, the number of the processors is one or more, and the number of memories is one or more.

In one implementation, the memory may be integrated with the processor, or the memory may be disposed separately from the processor.

In one implementation, the terminal device further includes a transmitting machine (transmitter) and a receiving machine (receiver).

In the sixth aspect, the present disclosure provides a network device including a processor and a memory. The memory is configured to store a computer program, and the processor is configured to invoke and run the computer program stored in the memory to perform the method in the above second aspect or various implementations thereof.

In one implementation, the number of the processors is one or more, and the number of memories is one or more.

In one implementation, the memory may be integrated with the processor, or the memory may be disposed separately from the processor.

In one implementation, the network device further includes a transmitting machine (transmitter) and a receiving machine (receiver).

In the seventh aspect, the present disclosure provides a chip for implementing the method in any of the first to second aspects or various implementations thereof. In particular, the chip includes a processor. The processor is configured to invoke and run a computer program from a memory to cause a device installed with the chip to perform the method in any of the first to second aspects or various implementations thereof.

In the eighth aspect, the present disclosure provides a computer-readable storage medium for storing a computer program. The computer program causes a computer to perform the method in any of the first to second aspects or various implementations thereof.

In the ninth aspect, the present disclosure provides a computer program product including computer program instructions. The computer program instructions cause a computer to perform the method in any of the first to second aspects or various implementations thereof.

In the tenth aspect, the present disclosure provides a computer program. When the computer program is run on a computer, the computer performs the method in any of the first to second aspects or various implementations thereof.

Based on the above solutions, the back scattering signal is designed as a signal formed by reflecting and modulating the power supply signal transmitted by the power supply node in the manner of CDM, which is beneficial for multiple zero-power terminals to flexibly multiplex the same transmission resources. Furthermore, not only the zero-power terminal can be applied to the cellular Internet of Things to enrich the type and quantity of the linked terminals in the network, thus truly realizing the Internet of Everything, but also the utilization rate of resources and the reliability of data transmission can be improved, and the power utilization efficiency of the zero-power terminal is further improved.

In addition, it is considered that the zero-power terminal operates based on the electromagnetic/inductive coupling of radio, and an internal oscillator is needed to provide and maintain the clock, and the internal oscillator is difficult to ensure an accurate clock from a simplified point of view, so that it is difficult to compensate the distance difference between the terminal device and the network device by timing adjustment. However, if an external electrically coupled power source is used, the stability of the external electrically coupled power source is not as good as that of an active device. In this embodiment, the back scattering signal is designed as a signal formed by reflecting and modulating the power supply signal transmitted by the power supply node in the manner of CDM, which can overcome the timing errors, frequency errors and even phase errors of the terminal device through the CDM modulation mode, thereby improving the system performance.

It should also be understood that the terms used in the embodiments of the present disclosure and the appended claims are for the purpose of describing specific embodiments only and are not intended to limit the embodiments of the present disclosure. For example, the singular forms of "a", "said", "above" and "the" as used in the embodiments of the present disclosure and the appended claims are also intended to include multiple forms, unless the context clearly dictates otherwise.

Those skilled in the art will appreciate that the various example units and algorithm steps described in combination with the embodiments disclosed in the present disclosure may be implemented in electronic hardware or a combination of computer software and electronic hardware. Whether these functions are performed in hardware or software depends on the specific application and design constraints of the technical solutions. Skilled artisans may use different methods for each particular application to implement the described function, but such implementation should not be considered beyond the scope of the embodiments of the present disclosure. If implemented in the form of a software function unit and sold or used as a stand-alone product, they may be stored in a computer-readable storage medium. Based on this understanding, the technical solutions of the embodiments of the present disclosure may be embodied in the form of a software product in essence or contributing to the prior art, or part of the technical solution. The computer software product is stored in a storage medium and includes instructions for causing a computer device (which may be a personal computer, server, or network device, etc.) to perform all or part of the steps of the method of the embodiments of the present disclosure. The aforementioned storage medium includes various medium capable of storing program codes, such as U disk, mobile hard disk, read only memory, random access memory, magnetic disk or optical disk.

Those skilled in the art will also appreciate that, for convenience and brevity of description, specific operating processes of the above-described systems, apparatuses, and units may refer to corresponding processes in the foregoing method embodiments and will not be repeated in the present disclosure. In several embodiments provided in the present disclosure, it should be understood that the disclosed systems, apparatuses and methods may be implemented in other ways. For example, the partition of units, modules or components in the above-described embodiments of the apparatus is only a logical functional partition, which may be implemented in another way, for example, multiple units, modules or components may be combined or integrated into another system, or some units, modules or components may be ignored or not executed. For another example, the units/modules/components described above as separation/display components may or may not be physically separated, i.e. may be located in one place, or may be distributed over multiple network elements. Some or all of the units/modules/components may be selected according to actual needs to achieve the object of the embodiment of the present disclosure. Finally, it should be noted that the coupling or direct coupling or communication connection between each other shown or discussed above may be indirect coupling or communication connection through some interface, device or unit, and may be electrical, mechanical or other form.

The above are only the embodiments of the present disclosure, but the protection scope of the present disclosure is not limited thereto. Any person skilled in the art who is familiar with the technical filed can readily think of modifications or substitutions that should fall within the protection scope of the present disclosure. Therefore, the protection scope of the present disclosure should be subject to the protection scope of the claims.

The invention claimed is:

1. A method for wireless communication, comprising:

receiving a triggering signal transmitted by a network device; and transmitting a back scattering signal to the network device, wherein the back scattering signal is a signal formed by reflecting and modulating a power supply signal transmitted by a power supply node in a manner of Code Division Multiplexing (CDM);

wherein the method further comprises:

acquiring a first base sequence for a terminal device from a plurality of base sequences, wherein the plurality of base sequences are respectively used for distinguishing a plurality of terminal devices, and the plurality of terminal devices comprise the terminal device; and performing reflection and spread-spectrum on the power supply signal in the manner of CDM based on the first base sequence, to obtain the back scattering signal, or performing spread-spectrum on a modulation signal in the manner of CDM based on the first base sequence to obtain the back scattering signal, wherein the modulation signal is a signal formed by reflecting and modulating the power supply signal based on information to be transmitted of the terminal device;

wherein acquiring the first base sequence for the terminal device from the plurality of base sequences comprises:

determining the first base sequence from the plurality of base sequences according to all or part of information pre-stored in the terminal device and a number of terminal devices communicating in the manner of CDM, wherein determining the first base sequence from the plurality of base sequences according to the all or part of the information pre-stored in the terminal device and the number of terminal devices communicating in the manner of CDM comprises:

determining the first base sequence according to following formula:

C=m mod k:

where C is used to represent the first base sequence, m is used to represent the all or part of the information pre-stored in the terminal device, k is used to represent the number of terminal devices communicating in the manner of CDM, and mod is used to represent an modulo division operation, wherein the information pre-stored in the terminal device comprises an identification of the terminal device.

2. The method of claim 1, wherein an uplink frame structure used for the back scattering signal comprises at least one reflection period, each of the at least one reflection period comprises at least one reflection time unit, each of the at least one reflection time unit comprises at least one Guard Period (GP) and at least one reflection time segment, and each of the at least one reflection time segment is a transmitting occasion of the back scattering signal.

3. The method of claim 2, wherein the reflection time unit comprises a GP and a reflection time segment, wherein the GP is before the reflection time segment, or the GP is after the reflection time segment, wherein the at least one reflection period is a plurality of reflection periods, and the plurality of reflection periods are continuous or discontinuous in a time domain.

4. The method of claim 1, wherein at least one of the following applies:

cross-correlations among different base sequences in the plurality of base sequences are less than or equal to a first threshold; or an autocorrelation of each of the plurality of base sequences is greater than or equal to a second threshold.

5. The method of claim 1, wherein the plurality of base sequences comprise a Discrete Fourier Transformation (DFT) sequence or a pseudo random sequence, wherein the pseudo random sequence comprises at least one of an M sequence or a Gold sequence.

6. The method of claim 1, wherein the back scattering signal is a signal formed by reflecting and modulating the power supply signal in the manner of CDM and a manner of Frequency Division Duplex (FDD), wherein transmitting the back scattering signal to the network device comprises:

determining a second frequency band according to a first offset and a first frequency band, wherein the first frequency band is at least one of a frequency band where the triggering signal is located or a frequency band where the power supply signal is located; and transmitting, on the second frequency band, the back scattering signal to the network device.

7. The method of claim 1, wherein the back scattering signal is a signal formed by reflecting and modulating the power supply signal in the manner of CDM and a manner of Time Division Duplex (TDD), wherein transmitting the back scattering signal to the network device comprises:

determining a second reflection time unit according to a second offset and a first reflection time unit, wherein the first reflection time unit is at least one of a frequency band where the triggering signal is located or a reflection time unit where the power supply signal is located; and transmitting, on the second reflection time unit, the back scattering signal to the network device.

8. A method for wireless communication, comprising:

transmitting a triggering signal to a terminal device; and receiving a back scattering signal transmitted by the terminal device;

wherein the back scattering signal is a signal formed by reflecting and modulating a power supply signal transmitted by a power supply node in a manner of Code Division Multiplexing (CDM);

wherein the method further comprises:

acquiring a first base sequence for the terminal device from a plurality of base sequences, wherein the plurality of base sequences are respectively used for distinguishing a plurality of terminal devices, and the plurality of terminal devices comprise the terminal device; and demodulating the back scattering signal in the manner of CDM based on the first base sequence, to obtain a demodulated signal;

wherein acquiring the first base sequence for the terminal device from the plurality of base sequences comprises:

determining the first base sequence from the plurality of base sequences according to all or part of information pre-stored in the terminal device and a number of terminal devices communicating in the manner of CDM, wherein determining the first base sequence from the plurality of base sequences according to the all or part of the information pre-stored in the terminal device and the number of terminal devices communicating in the manner of CDM comprises:

determining the first base sequence according to following formula:

C=m mod k;

where C is used to represent the first base sequence, m is used to represent the all or part of the information pre-stored in the terminal device, k is used to represent the number of terminal devices communicating in the manner of CDM, and mod is used to represent an modulo division operation, wherein the information pre-stored in the terminal device comprises an identification of the terminal device.

9. The method of claim 8, wherein an uplink frame structure used for the back scattering signal comprises at least one reflection period, each of the at least one reflection period comprises at least one reflection time unit, each of the at least one reflection time unit comprises at least one Guard Period (GP) and at least one reflection time segment, and each of the at least one reflection time segment is a transmitting occasion of the back scattering signal.

10. The method of claim 9, wherein the reflection time unit comprises a GP and a reflection time segment, wherein the GP is before the reflection time segment, or the GP is after the reflection time segment, wherein the at least one reflection period is a plurality of reflection periods, and the plurality of reflection periods are continuous or discontinuous in a time domain.

11. The method of claim 8, wherein at least one of the following applies:

cross-correlations among different base sequences in the plurality of base sequences are less than or equal to a first threshold; or an autocorrelation of each of the plurality of base sequences is greater than or equal to a second threshold.

12. The method of claim 8, wherein the plurality of base sequences comprise a Discrete Fourier Transformation (DFT) sequence or a pseudo random sequence, wherein the pseudo random sequence comprises at least one of an M sequence or a Gold sequence.

13. The method of claim 8, wherein the back scattering signal is a signal formed by reflecting and modulating the power supply signal in the manner of CDM and a manner of Frequency Division Duplex (FDD), wherein receiving the back scattering signal transmitted by the terminal device comprises:

determining a second frequency band according to a first offset and a first frequency band, wherein the first frequency band is at least one of a frequency band where the triggering signal is located or a frequency band where the power supply signal is located; and receiving, on the second frequency band, the back scattering signal transmitted by the terminal device.

14. The method of claim 8, wherein the back scattering signal is a signal formed by reflecting and modulating the power supply signal in the manner of CDM and a manner of Time Division Duplex (TDD), wherein receiving the back scattering signal transmitted by the terminal device comprises:

determining a second reflection time unit according to a second offset and a first reflection time unit, wherein the first reflection time unit is at least one of a frequency band where the triggering signal is located or a reflection time unit where the power supply signal is located; and receiving, on the second reflection time unit, the back scattering signal transmitted by the terminal device.

15. A terminal device, comprising:

a processor;

a memory for storing a computer program executable by the processor; and a transceiver, configured to:

receive a triggering signal transmitted by a network device; and transmit a back scattering signal to the network device, wherein the back scattering signal is a signal formed by reflecting and modulating a power supply signal transmitted by a power supply node in a manner of Code Division Multiplexing (CDM);

wherein the processor is configured to:

acquire a first base sequence for a terminal device from a plurality of base sequences, wherein the plurality of base sequences are respectively used for distinguishing a plurality of terminal devices, and the plurality of terminal devices comprise the terminal device; and perform reflection and spread-spectrum on the power supply signal in the manner of CDM based on the first base sequence, to obtain the back scattering signal, or perform spread-spectrum on a modulation signal in the manner of CDM based on the first base sequence, to obtain the back scattering signal, wherein the modulation signal is a signal formed by reflecting and modulating the power supply signal based on information to be transmitted of the terminal device;

wherein in acquiring the first base sequence for the terminal device from the plurality of base sequences, the processor is specifically configured to:

determine the first base sequence from the plurality of base sequences according to all or part of information pre-stored in the terminal device and a number of terminal devices communicating in the manner of CDM, wherein in determining the first base sequence from the plurality of base sequences according to the all or part of the information pre-stored in the terminal device and the number of terminal devices communicating in the manner of CDM, the processor is specifically configured to:

determine the first base sequence according to following formula:

C=m mod k;

where C is used to represent the first base sequence, m is used to represent the all or part of the information pre-stored in the terminal device, k is used to represent the number of terminal devices communicating in the manner of CDM, and mod is used to represent an modulo division operation, wherein the information pre-stored in the terminal device comprises an identification of the terminal device.

16. A network device, comprising:

a processor;

a memory for storing a computer program executable by the processor; and a transceiver, configured to:

transmit a triggering signal to a terminal device; and receive a back scattering signal transmitted by the terminal device, wherein the back scattering signal is a signal formed by reflecting and modulating a power supply signal transmitted by a power supply node in a manner of Code Division Multiplexing (CDM);

wherein the processor is configured to:

acquire a first base sequence for the terminal device from a plurality of base sequences, wherein the plurality of base sequences are respectively used for distinguishing a plurality of terminal devices, and the plurality of terminal devices comprise the terminal device; and demodulate the back scattering signal in the manner of CDM based on the first base sequence, to obtain a demodulated signal:

wherein in acquiring the first base sequence for the terminal device from the plurality of base sequences, the processor is specifically configured to:

determine the first base sequence from the plurality of base sequences according to all or part of information pre-stored in the terminal device and a number of terminal devices communicating in the manner of CDM, wherein in determining the first base sequence from the plurality of base sequences according to the all or part of the information pre-stored in the terminal device and the number of terminal devices communicating in the manner of CDM, the processor is specifically configured to:

determine the first base sequence according to following formula:

C=m mod k;

where C is used to represent the first base sequence, m is used to represent the all or part of the information pre-stored in the terminal device, k is used to represent the number of terminal devices communicating in the manner of CDM, and mod is used to represent an modulo division operation, wherein the information pre-stored in the terminal device comprises an identification of the terminal device.

* * * * *